Sept. 2, 1930.  H. C. RICHARDSON  1,774,526
AIRCRAFT
Filed March 11, 1926   2 Sheets-Sheet 2
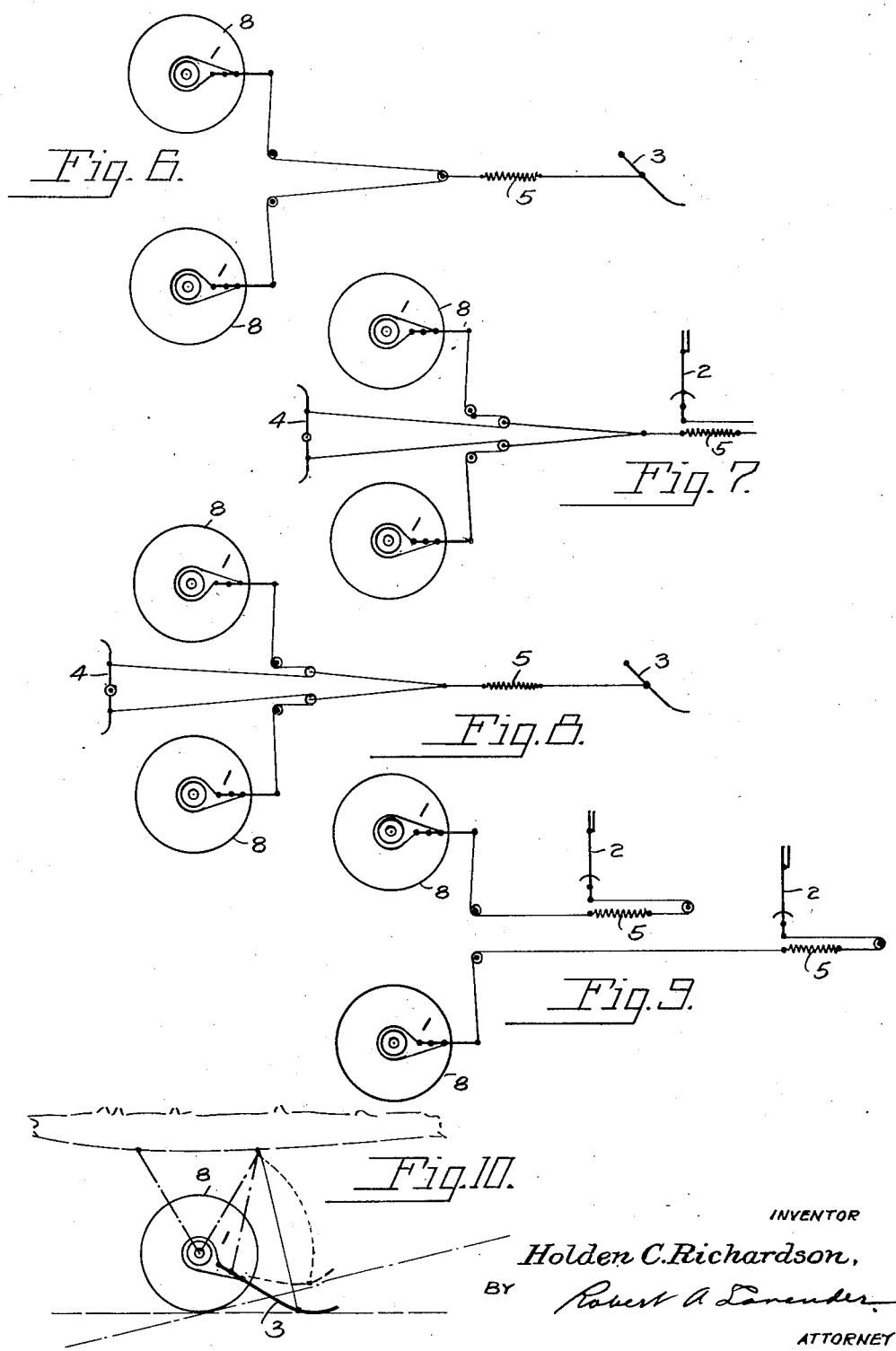
INVENTOR
Holden C. Richardson,
BY
Robert A. Lavender
ATTORNEY Patented Sept. 2, 1930

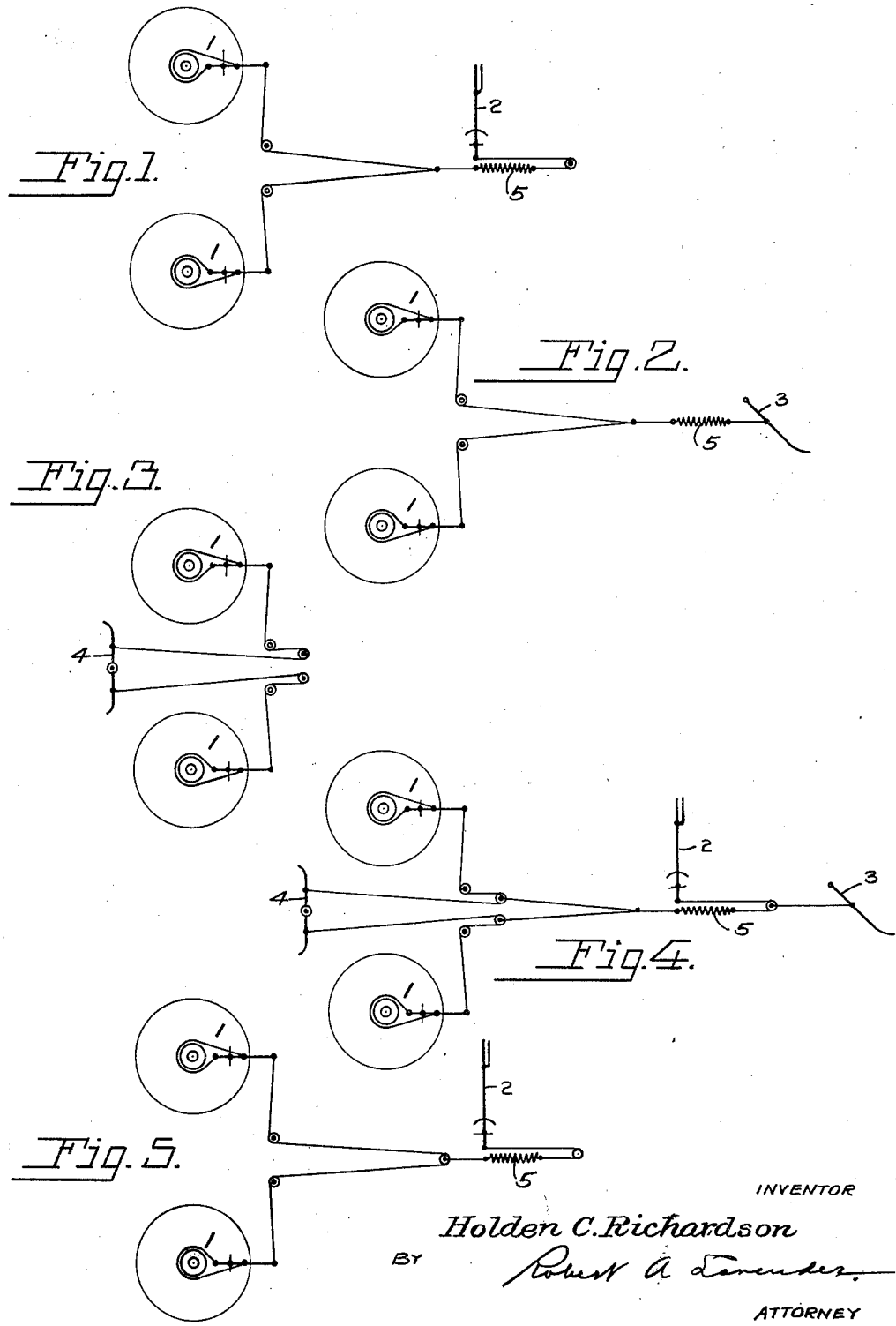

1,774,526

UNITED STATES PATENT OFFICE

HOLDEN C. RICHARDSON, OF WASHINGTON, DISTRICT OF COLUMBIA

AIRCRAFT

Application filed March 11, 1926. Serial No. 93,984.

(GRANTED UNDER THE ACT OF MARCH 3, 1883, AS AMENDED APRIL 30, 1928; 370 O. G. 757)

My invention relates broadly to aircraft and more particularly to the slowing down or retarding of aircraft after landing on a surface.

The principal object of my invention is to provide means for quickly bringing an airplane to rest after landing on a surface.

Another object of my invention is to provide a new means for steering an airplane after landing on a surface or while taxiing to a take-off.

Further objects of my invention will appear hereinafter.

My invention consists substantially in the construction, combination and relative arrangement of parts all of which will be more fully hereinafter set forth, as shown by the accompanying drawings, and fully pointed out in the appended claims.

Reference is to be had to the accompanying drawings forming part of this specification in which like reference characters indicate corresponding parts throughout the several views, and in which—

Figure 1 is a diagrammatic arrangement of one unit of the preferred embodiment showing a manual means for controlling the retardation of an airplane.

Figure 2 is a modification of my invention showing an automatic control of retardation, Figure 3 shows a retardation means for an airplane, the control of which is combined with the steering mechanism of the airplane, Figure 4 shows my invention incorporating the combined units shown in Figures 1, 2, and 3, Figure 5 is a modification of my invention as shown in Figure 1 in that the brakes may be connected to operate balanced instead of direct, Figure 6 shows a modification of my invention as disclosed in Figure 2 in that the brakes may be connected to operate balanced instead of direct, Figure 7 is a combination of the units shown in Figures 1 and 3, Figure 8 shows the combination of the units incorporated in Figures 2 and 3, Figure 9 is a further modification of the arrangement shown in Figure 1 in which the brakes may be operated separately instead of simultaneously, and Figure 10 shows an arrangement for obtaining the brake mechanism in combination with auxiliary skids secured at the landing wheels.

Referring more particularly to the drawings, 1 indicates a braking mechanism secured to the landing wheels 8 of an airplane. The brakes shown may be of any conventional design, whether internal expanded, or external contracted. The braking mechanism 1 is connected preferably by leads or the like, passing over sheaves, bell-cranks, or the like, when necessary, to the operating mechanism as shown. 2 represents a lever for manually operating the brakes or taking up the slack of the leads.

For automatically operating the brakes I provide leads connected to the tail skid 3 which connection is made at any convenient point of the tail skid. Suitable shock absorption tension members 5 may be added, the adjustment of which is accomplished by means of the lever 3.

The braking mechanism may be connected to the rudder bar 4, a part of the normal steering equipment of an airplane, to operate the brakes differentially in cooperation with the operation of the vertical rudder of the airplane when landing or when taxiing into a position for takeoff.

In some cases it may be desirable to provide an independent skid for the control of the braking mechanism. Such an arrangement is shown in Figure 10.

It will be understood that the manually operable lever 2, which is of the type that may be locked in its different positions, may be employed, when set, for instance, at its half-way point, as shown in Figure 4, or at other desirable points, to increase or decrease to the desired extent, required by the particular emergency, the action of the trailing skid 3 upon the braking mechanism of each of the wheels, while the operation of the pivoted foot operable member 4 may vary, to the desired extent, differential action of said braking mechanism upon each of the wheels 1; and said controlled variable action may be also further actuated, or set to increase or to decrease to the desired extent said braking action by either or both manually operable lever 2 or trailing skid 3.

Said lever 2 may also release the braking action of trailing skid 3 upon wheels, by being set at its most relieving position, and may also be set to take up the stretch of the cables or the wear of the parts and connections.

The connection of trailing skid 3 with the braking mechanism through the connection therewith of lever 2 is a differential connection, as is also the connection of said differential connection with the connecting means between the wheel braking means and the member 4.

The lightness essential to aircraft accentuates the major problem of landing manipulations when landing in restricted areas or in adverse other conditions requiring great flexibility and rapidity of manipulation of the landing control means and to enable each of the various control means to function to different degrees or extents under the uniform action of the automatically operated unit of the control means so as to control the craft with precision under adverse conditions and thus to avoid injury to craft and personnel. Such control of the craft requires substantial refinements in the various control means and in their operating means, as well as in the differential connections between the same so as to afford, when required, the cooperation of all of the various elements to varying degrees, or that the control be exercised alone by only one or more of said control means.

It will be understood that the above description and accompanying drawings comprehend only the general and preferred embodiment of my invention and that various minor changes in detail of construction, proportion and arrangement of parts may be made within the scope of the appended claims without sacrificing any of the advantages of my invention.

The invention herein described may be manufactured and used by or for the Government of the United States for governmental purposes without the payment to me of any royalty thereon or therefor.

Having thus described my invention, what I claim is:—

1. In a brake control for airplanes the combination of wheels for supporting the plane during ground travel, a skid adapted to trail on the ground during ground travel, means for braking each wheel, manually operable means connecting said braking means for producing a manually controlled differential action between said braking means and means differentially connecting said last stated means with said skid.

2. In a brake control for an airplane having supporting wheels and a displaceable trailing skid, the combination of means for retarding the rotary motion of each wheel, means for producing a differential action between the two retarding means and means attached to the trailing skid for uniformly actuating each of the retarding means irrespective of the displacement of the trailing skid said means consisting of a pulley attached to the trailing skid, a cable mechanically coupled to the differential means and passing through said pulley, a resilient member located within a section of said cable and means for varying the tension upon said resilient member.

3. In brake control for an airplane having supporting wheels and a trailing skid, the combination of a braking mechanism attached to each wheel, a plurality of pulleys and a multiarmed foot-pedal, a cable attached to each brake mechanism and passing through at least two of said pulleys and attached to each arm of said foot-pedal, a cable attached to at least one of each of said two pulleys, a resilient member attached to said cable, a pulley attached to the trailing skid, a cable attached to said resilient means and passing over said pulley and means attached to the end of said cable for establishing a varying tension upon said resilient means.

4. In a control for airplanes having supporting wheels and a trailing skid, the combination of a separate braking means for each of said wheels, means for operating said braking means each to a different extent, means connecting each of said braking means to said operating means, an independent operating means fixable at different positions, means connected to said independent operating means and differentially connected to said first named connecting means, and means for differentially connecting said last named connecting means to said trailing skid.

5. In a control for airplanes having supporting wheels and a trailing skid, the combination of a separate braking means for each of said wheels, means for operating said braking means each to a different extent, means including pivotal means connecting each of said braking means to said operating means, and means for connecting said trailing skid to said pivotal means.

6. In a brake control for airplanes the combination of wheels for supporting the plane during ground travel, a skid adapted to trail on the ground during ground travel, means for braking each wheel, manually operable means connecting said braking means for producing a manually controlled differential action between said braking means, a second manually operable means for controlling the operable effect of said skid and said manually operable means on said braking means; and means differentially connecting together said skid, braking means and said two manually operable means.

HOLDEN C. RICHARDSON.